(12) United States Patent
Abbanato

(10) Patent No.: US 9,068,691 B2
(45) Date of Patent: Jun. 30, 2015

(54) COMPUTING DEVICE STAND AND RELATED METHODS

(71) Applicant: Kevin Abbanato, Davie, FL (US)

(72) Inventor: Kevin Abbanato, Davie, FL (US)

(\*) Notice: Subject to any disclaimer, the term of this patent is extended or adjusted under 35 U.S.C. 154(b) by 0 days.

(21) Appl. No.: 13/656,003

(22) Filed: Oct. 19, 2012

(65) Prior Publication Data

US 2014/0110542 A1 Apr. 24, 2014

(51) Int. Cl.

| | |
|---|---|
| F16M 11/00 | (2006.01) |
| F16M 11/08 | (2006.01) |
| F16M 11/18 | (2006.01) |
| F16M 11/28 | (2006.01) |
| F16M 11/42 | (2006.01) |
| F16M 13/02 | (2006.01) |
| G06F 1/16 | (2006.01) |
| F16M 11/04 | (2006.01) |
| F16M 11/02 | (2006.01) |
| A47B 5/00 | (2006.01) |

(52) U.S. Cl.
CPC ............ *F16M 11/08* (2013.01); *Y10T 29/49947* (2015.01); *F16M 11/18* (2013.01); *F16M 11/28* (2013.01); *F16M 11/42* (2013.01); *F16M 11/425* (2013.01); *F16M 13/027* (2013.01); *G06F 1/1632* (2013.01)

(58) Field of Classification Search
USPC ................... 248/121, 317, 323, 370; 108/149
See application file for complete search history.

(56) References Cited

U.S. PATENT DOCUMENTS

| | | | |
|---|---|---|---|
| 3,562,796 A | 2/1971 | Jacobson | |
| 3,711,021 A | 1/1973 | Tantillo | |
| 3,711,877 A * | 1/1973 | Averill | ............................ 5/87.1 |
| 4,108,084 A * | 8/1978 | Fink | ............................... 108/29 |
| 4,316,545 A | 2/1982 | Hartnell | |
| 5,542,314 A | 8/1996 | Sullivan et al. | |
| 5,788,093 A | 8/1998 | Krut | |
| 5,899,421 A | 5/1999 | Silverman | |
| 6,006,970 A | 12/1999 | Piatt | |
| 6,029,580 A | 2/2000 | Alfonso et al. | |
| 6,102,218 A | 8/2000 | Alfonso et al. | |
| 6,230,440 B1 | 5/2001 | Deutsch | |
| 6,257,421 B1 | 7/2001 | Outten | |
| 6,505,797 B1 | 1/2003 | Dempsey | |
| D469,930 S | 2/2003 | Bloedorn | |
| 6,926,236 B2 | 8/2005 | Jette | |
| 7,032,792 B2 | 4/2006 | Berry | |
| 7,267,314 B1 | 9/2007 | Erickson | |
| 7,373,759 B1 | 5/2008 | Simmons | |
| 2004/0016784 A1 | 1/2004 | Berry | |
| 2004/0238468 A1 | 12/2004 | Dosso et al. | |
| 2005/0219356 A1 | 10/2005 | Smith et al. | |
| 2006/0207952 A1 | 9/2006 | Timmons | |
| 2007/0012827 A1* | 1/2007 | Fu et al. | ...................... 248/163.1 |
| 2007/0051766 A1* | 3/2007 | Spencer | ......................... 224/607 |
| 2008/0164397 A1 | 7/2008 | Cancilliari et al. | |
| 2008/0197248 A1 | 8/2008 | Fenton | |
| 2008/0225534 A1 | 9/2008 | Rus et al. | |
| 2009/0140023 A1 | 6/2009 | Noble | |

(Continued)

*Primary Examiner* — Jonathan Liu
*Assistant Examiner* — Taylor Morris
(74) *Attorney, Agent, or Firm* — Allen, Dyer, Dopplet, Milbrath & Gilchrist, P.A.

(57) ABSTRACT

A stand for a computing device may include a body having first and second opposing longitudinal sides, and first and second opposing ends, and a retention strap extending between the first and second opposing ends. The stand may include first and second fasteners coupled respectively to the first and second opposing ends and to be coupled to a support structure.

1 Claim, 4 Drawing Sheets

(56) References Cited

U.S. PATENT DOCUMENTS

| | | |
|---|---|---|
| 2009/0321490 A1 | 12/2009 | Groene et al. |
| 2010/0012600 A1 | 1/2010 | Clontz et al. |
| 2011/0192390 A1* | 8/2011 | Johnson .......................... 126/30 |

* cited by examiner

COMPUTING DEVICE STAND AND RELATED METHODS

FIELD OF THE INVENTION

The present invention relates to the field of stands, and, more particularly, to an electronic device stand and related methods.

BACKGROUND OF THE INVENTION

With the popularity of portable computing devices, such as tablet and laptop computing devices, users are operating such devices in a wide variety of environments. Many of these environments do not have the typical workspace area of typical workstations and may include areas, such as couches or beds, where there is no workspace to place the computing device.

There have been approaches to providing mobile stands for computing devices for use in such environments. One approach for a mobile stand is disclosed in U.S. Pat. No. 6,006,970 to Piatt. The mobile stand comprises a strap that wraps around the body of the user, and a platform coupled to the strap and for supporting the computing device.

SUMMARY OF THE INVENTION

In view of the foregoing background, it is therefore an object of the present invention to provide a stand for a computing device that is easier to use.

This and other objects, features, and advantages in accordance with the present invention are provided by a stand for a computing device that may comprise a body having first and second opposing longitudinal sides, and first and second opposing ends, and a retention strap extending between the first and second opposing ends. The stand may include first and second fasteners coupled respectively to the first and second opposing ends and to be coupled to a support structure. Advantageously, the user may readily manipulate the positioning of the computing device while on the stand.

More specifically, the body may define a plurality of slots extending between the first and second opposing longitudinal sides. The body may comprise a substantially flat body. The body may comprise first and second major surfaces, and the first and second opposing ends may each comprise a portion extending transversely to the first and second major surfaces and comprising a plurality of laterally extending supports therein.

Additionally, the first and second fasteners may be coupled to respective pluralities of laterally extending supports from the first and second opposing ends. The first opposing longitudinal side may comprise a portion extending transversely to the first and second major surfaces and defining at least one slot to receive a cable from the computing device. For example, the first and second fasteners may comprise first and second adjustable fasteners.

Another aspect is directed to a method for making a stand for a computing device. The method may comprise forming a body having first and second opposing longitudinal sides, and first and second opposing ends, coupling a retention strap to extend between the first and second opposing ends, and coupling first and second fasteners respectively to the first and second opposing ends.

DETAILED DESCRIPTION OF THE PREFERRED EMBODIMENTS

Figure 1:
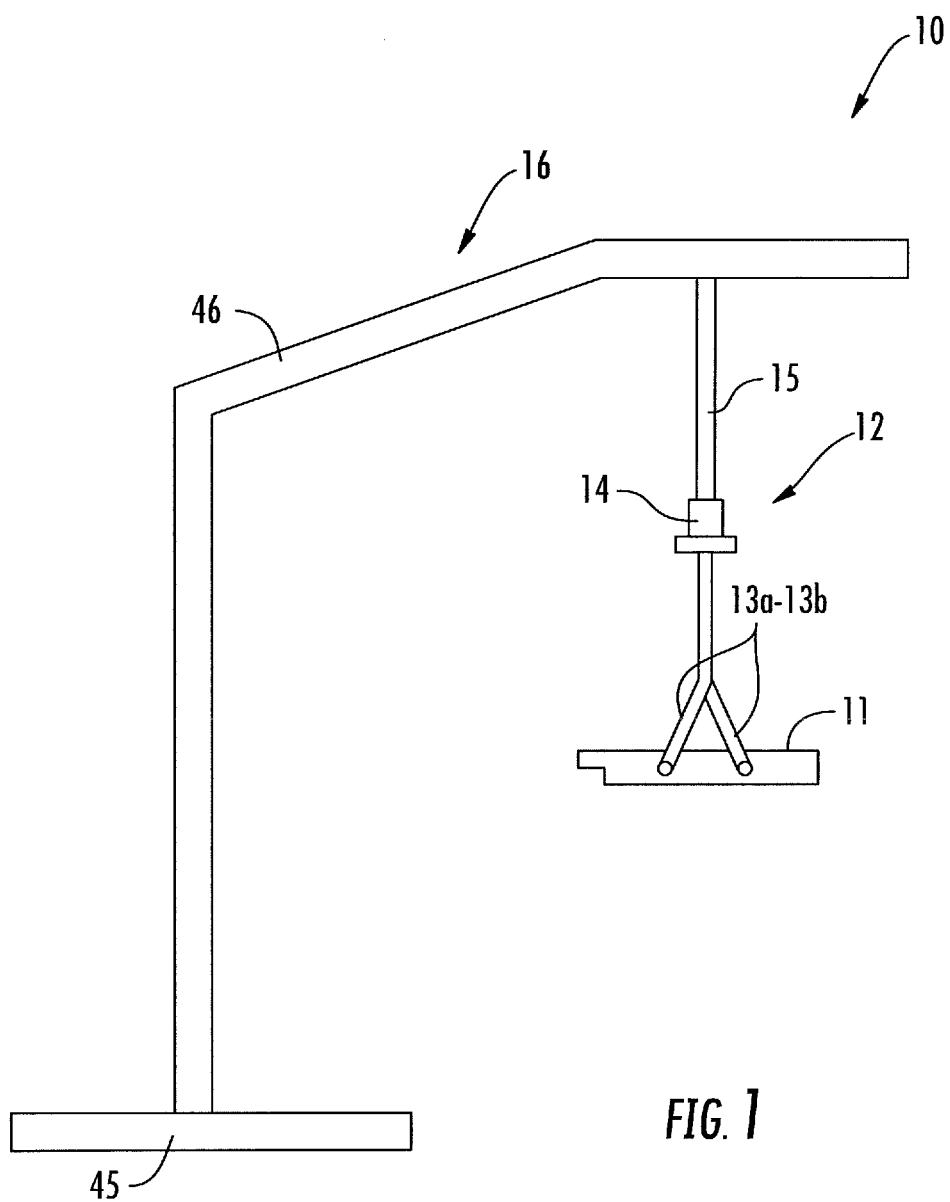
FIG. 1 is a perspective view of a stand, according to the present invention.
Figure 2:
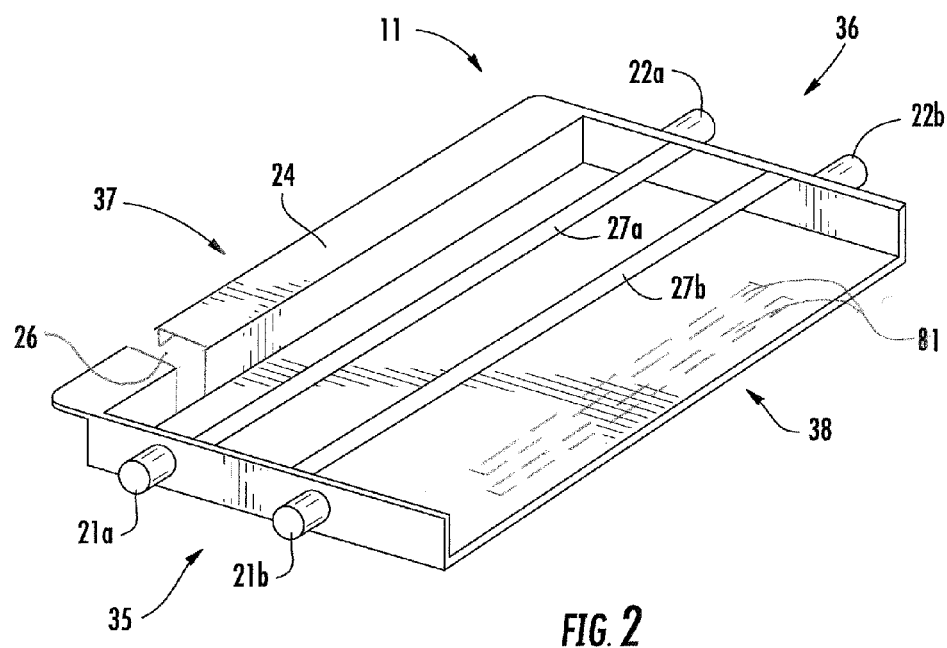
FIG. 2 is a perspective view of the body from the stand of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring now to FIGS. 1-3A, a stand 10 according to the present invention is now described. The stand 10 is for positioning a computing device 31, such as a laptop computing device (FIG. 3A) or a tablet computing device (FIGS. 3B-3C). The stand 10 illustratively includes a body 11 having first and second opposing longitudinal sides 37-38, and first and second opposing ends 35-36. The stand 10 illustratively includes a plurality of retention straps 27a-27b (e.g. elastic bands) extending between the first and second opposing ends 35-36. The plurality of retention straps 27a-27b maintains the position of the computing device 31 while in the stand 10.

The stand 10 illustratively includes a support structure 16, which comprises a base 45, and an arm 46 coupled thereto. In some embodiments, the base 45 may include casters to provide mobility for the stand 10. Additionally, the arm 46 may comprise an adjustable arrangement, such as a telescoping or a bending arm.

The stand 10 illustratively includes first and second fasteners 13a-13b coupled respectively to the first and second opposing ends 35-36, and coupled to the support structure 16. For example, the first and second fasteners 13a-13b may comprise first and second adjustable fasteners (e.g. hook and loop or adjustable strap). Each fastener 13a-13b may comprise a tether, a cable, a rubber or fabric strap, or a chain (metallic or plastic) link tie.

The stand 10 illustratively includes a coupling arrangement 12 between the arm 46 to the body 11. The coupling arrangement 12 illustratively includes a first portion 15, a swiveling coupler 14 coupled to the first portion, and the first and second fasteners 13a-13b coupled to the swiveling coupler.

In other embodiments, the support structure 16 may comprise a fixed element attached to a ceiling. For example, in these embodiments, the coupling arrangement 12 may be attached to a ceiling of a room. Additionally, in industrial embodiments, the support structure may comprise a plurality of rails attached to the ceiling, and a sliding platform moving along the rails. The coupling arrangement 12 would attach to the sliding platform.

In yet other embodiments, the support structure 16 may include a motor for retracting the coupling arrangement 12 when not in user. In these embodiments, the swiveling coupler 14 is omitted. In advantageous embodiments, the computing device 31 may selectively activate the motor to retract the coupling arrangement when no user activity is detected, such as when the computing device enters a sleep mode.

In the illustrated embodiment, the body 11 is substantially flat, but in other embodiments, the body may comprise indentations/recesses to better receive the computing device 31. The body 11 comprises first and second major surfaces extending between the first and second opposing longitudinal sides 37-38, and the first and second opposing ends 35-36. In some embodiments, the first and second major surfaces may each include rubber portions 81 for preventing movement of the computing device 31 during use. As perhaps best seen in FIG. 2, the first and second opposing ends 35-36 each comprises a portion extending transversely to the first and second major surfaces. The transverse portion comprises a plurality of laterally extending supports 21a-22b therein. Additionally, the first and second fasteners 13a-13b are coupled respectively to the pluralities of laterally extending supports 21a-22b from the first and second opposing ends 35-36.

In the illustrated embodiment, the first opposing longitudinal side 37 illustratively includes a portion 24 extending transversely to the first and second major surfaces. This portion 24 prevents the computing device 31 from sliding off the body 11, i.e. a stop. In the illustrated embodiment, the second opposing longitudinal side 38 is open, thereby providing good access to the rear of the computing device 31, such as for power cables. In other embodiments, the second opposing longitudinal side 38 includes a transverse portion, thereby providing a tray type body 11 encompassing all sides. In these embodiments, the second opposing longitudinal side 38 may include a plurality of slots 26 in the respective transverse portion for placement of the cables from the computing device 31.

Figure 3A:
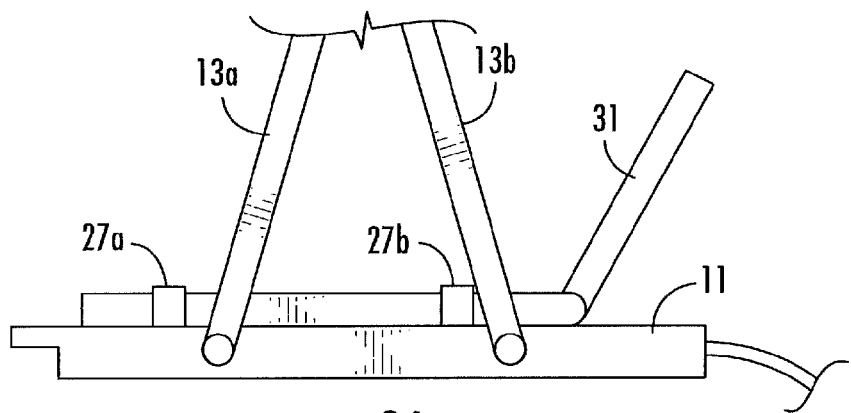
FIG. 3A is a side elevation view of the stand of FIG. 1 with a laptop computing device therein.
Figure 3B:
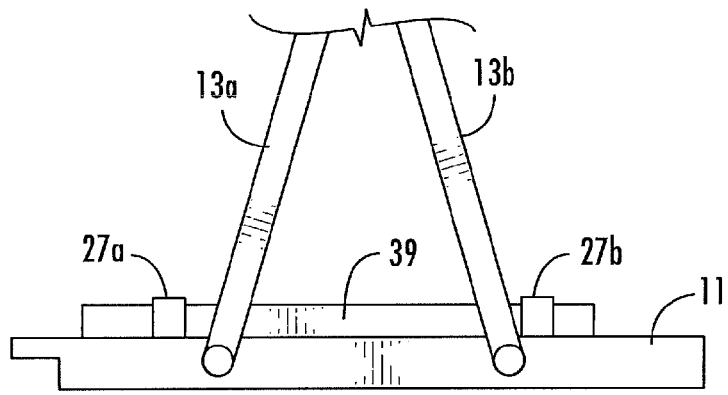
FIGS. 3B-3C are side elevation views of the stand of FIG. 1 with a tablet computing device therein.
Figure 3C:
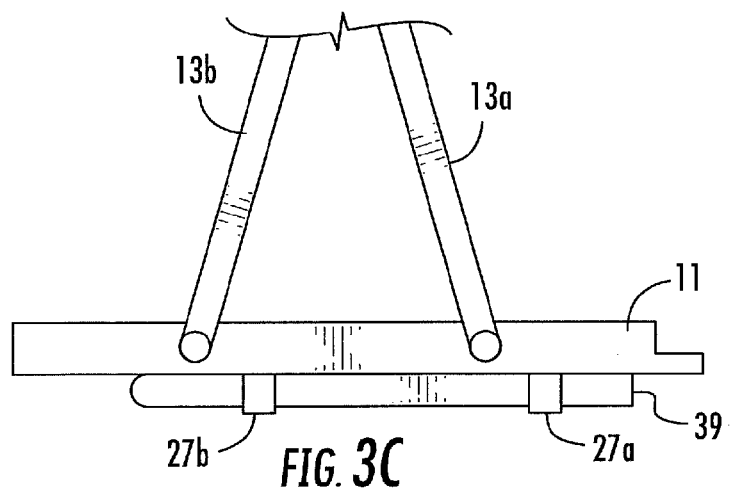

Referring now additionally to FIGS. 3B-3C, the stand 10 is shown with a tablet computing device 39. Advantageously, with the use of the retention straps 27a-27b, the body 11 may be flipped in vertical orientation. In the position of FIG. 3C, the user may use the tablet computing device 39 in a hands free mode, such as while lying down in bed, for example. Advantageously, this stand 10 arrangement provides low effort access for the user and may be helpful for handicapped users in particular. In these embodiments, the coupling between the first and second fasteners 13a-13b and the pluralities of laterally extending supports 21a-22b may be low friction, such as ball bearings based, and provide 360 degrees of rotation.

Another aspect is directed to a method for making a stand 10 for a computing device 31. The method may comprise forming a body 11 having first and second opposing longitudinal sides 37-38, and first and second opposing ends 35-36, coupling a retention strap 27a-27b to extend between the first and second opposing ends, and coupling first and second fasteners 13a-13b respectively to the first and second opposing ends.

Figure 4:
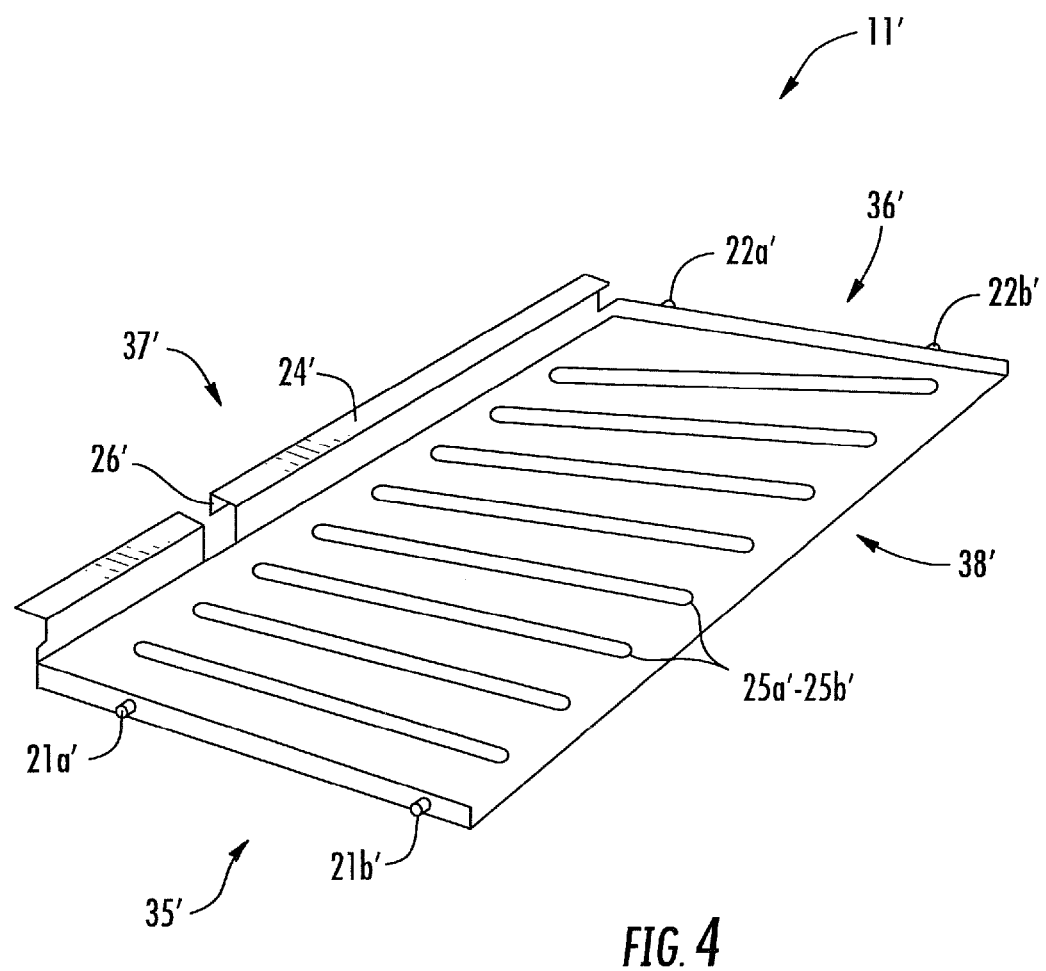
FIG. 4 is a perspective view of another embodiment of the body, according to the present invention.

Referring now additionally to FIG. 4, another embodiment of the stand 10' is now described. In this embodiment of the stand 10', those elements already discussed above with respect to FIGS. 1-2 are given prime notation and most require no further discussion herein. This embodiment differs from the previous embodiment in that the body 11' defines a plurality of slots 25a'-25b' extending between the first and second opposing longitudinal sides 37'-38'. The plurality of slots 25a'-25b' provide air circulation for the bottom of the computing device 31', thereby providing enhanced cooling. The first opposing longitudinal side 37' illustratively includes a portion extending transversely to the first and second major surfaces and defining a slot 26' to receive a cable from the computing device 31'.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A stand for a computing device consisting of:
    a body having first and second opposing longitudinal sides, first and second opposing ends, and first and second planar major surfaces, the first and second planar major surfaces each comprising rubber portions;
    said first opposing longitudinal side comprising
        a vertical portion extending transversely to said first and second planar major surfaces and defining at least one slot to receive a cable from the computing device, and
        a lip portion extending in parallel to said first and second planar major surfaces and defining an "L"-shaped lip with said vertical portion;
    said first and second opposing ends each comprising
        a sidewall extending transversely to said first and second planar major surfaces, and
        a plurality of cylindrical supports extending from the sidewall;
    a retention strap extending between said sidewalls of said first and second opposing ends, said retention strap comprising an elastic band;
    a support comprising a base, and a telescoping arm extending laterally therefrom;
    first and second adjustable fasteners coupled to respective pluralities of cylindrical supports from said first and second opposing ends, said first and second adjustable fasteners extending vertically from said telescoping arm to said body and comprising an elastic material;
    said body and said first and second adjustable fasteners being capable of being inverted; and
    a coupling arrangement comprising
        a first portion coupled to said telescoping arm, and
        a swiveling coupler coupled to said first portion, said first and second adjustable fasteners being coupled to the swiveling coupler;
    said first and second adjustable fasteners operating in first and second modes, the first mode comprising said first and second adjustable fasteners extending upwardly and vertically from said first planar major surface, the second mode comprising said first and second adjustable fasteners extending upwardly and vertically from said second planar major surface.

* * * * *